US009824223B2

(12) United States Patent
Pappas

(10) Patent No.: US 9,824,223 B2
(45) Date of Patent: *Nov. 21, 2017

(54) SYSTEM AND METHOD FOR AUTOMATED REMEDYING OF SECURITY VULNERABILITIES

(71) Applicant: Veracode, Inc., Burlington, MA (US)

(72) Inventor: Thomas M. Pappas, Watertown, MA (US)

(73) Assignee: Veracode, Inc., Burlington, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/088,741

(22) Filed: Apr. 1, 2016

(65) Prior Publication Data
US 2016/0292425 A1 Oct. 6, 2016

Related U.S. Application Data

(63) Continuation of application No. 14/496,798, filed on Sep. 25, 2014, now Pat. No. 9,317,695.

(60) Provisional application No. 61/882,347, filed on Sep. 25, 2013.

(51) Int. Cl.
G06F 21/57 (2013.01)
G06F 17/30 (2006.01)
G06F 9/445 (2006.01)
G06F 21/56 (2013.01)
H04L 29/06 (2006.01)

(52) U.S. Cl.
CPC .............. *G06F 21/577* (2013.01); *G06F 8/65* (2013.01); *G06F 17/30106* (2013.01); *G06F 21/565* (2013.01); *G06F 21/57* (2013.01); *G06F 2221/034* (2013.01); *H04L 63/145* (2013.01)

(58) Field of Classification Search
CPC ...... G06F 21/577; G06F 21/57; G06F 21/565; H04L 63/145
See application file for complete search history.

(56) References Cited

U.S. PATENT DOCUMENTS

| 6,317,880 | B1 * | 11/2001 | Chamberlain | G06F 8/65 707/999.202 |
| 6,477,703 | B1 * | 11/2002 | Smith | G06F 8/65 717/168 |
| 7,191,435 | B2 * | 3/2007 | Lau | G06F 8/65 714/38.1 |
| 7,424,706 | B2 * | 9/2008 | Ivanov | G06F 21/57 713/176 |

(Continued)

OTHER PUBLICATIONS

B. Coppens, B. De Sutter and K. De Bosschere, "Protecting Your Software Updates," in IEEE Security & Privacy, vol. 11, No. 2, pp. 47-54, Mar.-Apr. 2013.*

(Continued)

Primary Examiner — Kari Schmidt
(74) Attorney, Agent, or Firm — Goodwin Procter LLP

(57) ABSTRACT

In a binary patching system for alleviating security vulnerabilities in a binary representation of a software application, a binary code portion determined to be associated with a security vulnerability is replaced with a replacement binary code that can avoid such vulnerability without substantially changing the functionality of the code portion that was replaced. The replacement binary code can be selected based on properties and/or context of the code portion to be replaced.

27 Claims, 3 Drawing Sheets

(56) References Cited

U.S. PATENT DOCUMENTS

| | | | | |
|---|---|---|---|---|
| 8,468,516 B1* | 6/2013 | Chen | ............... | G06F 8/67 |
| | | | | 707/687 |
| 2002/0100036 A1* | 7/2002 | Moshir | ............... | G06F 8/62 |
| | | | | 717/173 |
| 2005/0015760 A1* | 1/2005 | Ivanov | ............... | G06F 21/57 |
| | | | | 717/168 |
| 2005/0071838 A1* | 3/2005 | Hatasaki | ............... | G06F 8/65 |
| | | | | 717/168 |
| 2006/0288341 A1* | 12/2006 | Wurden | ............... | G06F 9/44536 |
| | | | | 717/168 |
| 2007/0094655 A1* | 4/2007 | Rostampour | ............... | G06F 8/60 |
| | | | | 717/168 |
| 2008/0229282 A1* | 9/2008 | deVries | ............... | G06F 8/71 |
| | | | | 717/122 |
| 2011/0162070 A1* | 6/2011 | Krasser | ............... | G06F 21/56 |
| | | | | 726/23 |
| 2012/0222122 A1* | 8/2012 | Das | ............... | G06F 21/577 |
| | | | | 726/25 |

OTHER PUBLICATIONS

Peng Li and Baojiang Cui, "A comparative study on software vulnerability static analysis techniques and tools," 2010 IEEE International Conference on Information Theory and Information Security, Beijing, 2010, pp. 521-524.*

Zeng, Junyuan, et al. "Obfuscation resilient binary code reuse through trace-oriented programming." Proceedings of the 2013 ACM SIGSAC conference on Computer & communications security. ACM, 2013, pp. 487-498.*

Coppens, Bart, Bjorn De Sutter, and Jonas Maebe. "Feedback-driven binary code diversification." ACM Transactions on Architecture and Code Optimization (TACO) 9.4 (2013): 24.*

* cited by examiner

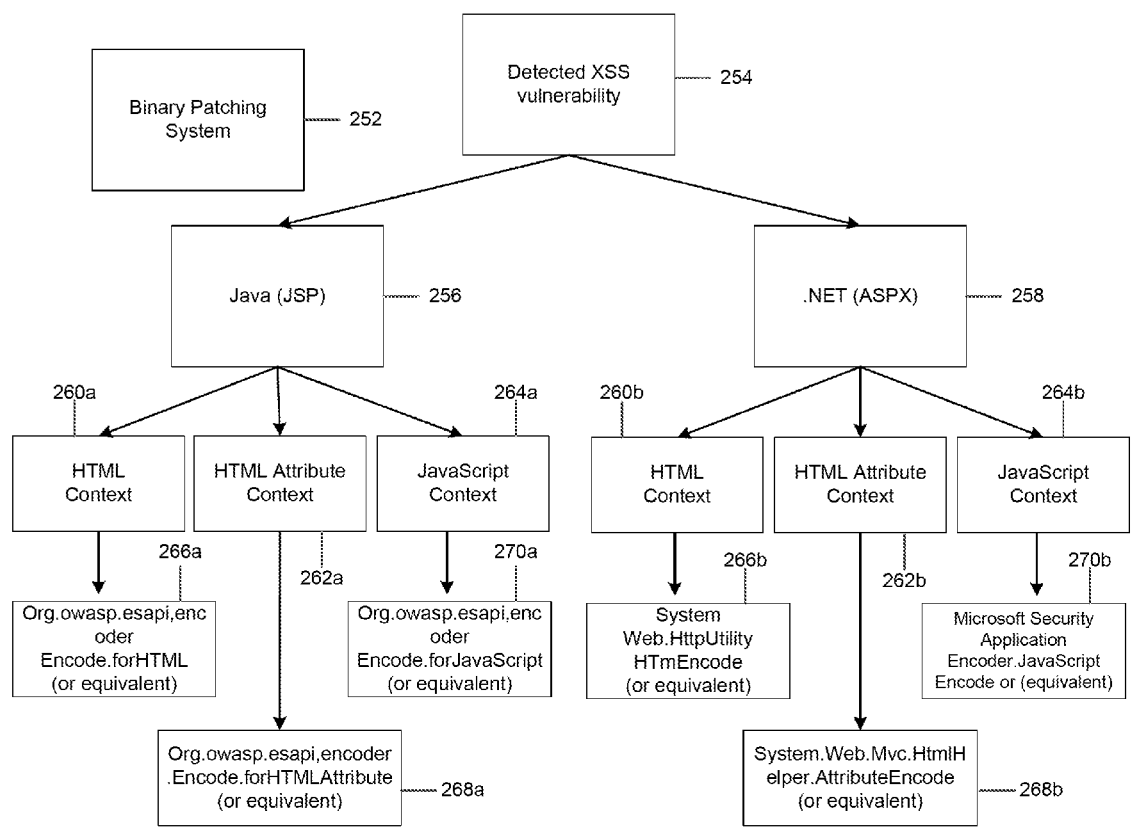

SYSTEM AND METHOD FOR AUTOMATED REMEDYING OF SECURITY VULNERABILITIES

CROSS-REFERENCE TO RELATED APPLICATIONS

This application is a continuation of U.S. patent application Ser. No. 14/496,798, entitled "System and Method for Automated Remedying of Security Vulnerabilities," filed on Sep. 25, 2014 and issued as U.S. Pat. No. 9,317,695, which claims the benefit of and priority to U.S. Provisional Patent Application Ser. No. 61/882,347, entitled "A System and Method for Automated Remedying of Security Vulnerabilities," filed on Sep. 25, 2013, each of which is incorporated herein by reference in its entirety.

FIELD OF THE INVENTION

The present invention generally relates to detection and mitigation or elimination of vulnerabilities in software applications, and more particularly to systems and methods for performing these operations directly on a compiled binary of a software application.

BACKGROUND OF THE INVENTION

Software applications typically include flaws or defects, causing the software to operate in an unintended or undesired manner. Some defects can also be exploited to gain unauthorized access to the software and/or data associated therewith. Typically, a skilled person can identify these defects by, e.g., testing the software system and analyzing human-readable source code of the software. The skilled person may then modify the source code to cure the defects, sometimes also called vulnerabilities. This processes requires reliance on skilled application developers and quality assurance (QA) personnel who have specialized understanding of software security. As such, the manual process of curing defects can be costly. It can also be time-consuming, and may extend the time-to-deliver to market within the software development life cycle (SDLC). In addition, the manual process can be error prone. For example, a cure in one part of the software may cause a new, unnoticed defect in another part. Therefore, there is a need for an improved system and/or method for curing defects in software applications.

SUMMARY OF THE INVENTION

Various embodiments of the present invention can detect and cure vulnerabilities in software applications, at least in part, by programmatically analyzing one or more binary files corresponding to the compiled software application. The analysis of the binary files can be performed statically, i.e., without requiring execution of the software application. A portion of the binary file is identified as being associated with a defect. A replacement, e.g., a binary patch, for the identified portion is explored in a library or database of patches. In some instances, modifying the software binary files using a patch can change the behavior of the application. In those instances, or if a matching binary patch is not found, a notification is provided to a user, who can manually address the identified defect. Otherwise, however, the identified portion is replaced with the patch, curing or at least mitigating the defect, without requiring intervention by skilled personnel, thereby decreasing the time-to-deliver in the SDLC and/or software cost.

Accordingly, in one aspect, a method for automatically remedying security flaws includes receiving in memory a static binary analysis report for a binary file corresponding to an application. The method also includes identifying by a processor a section of the binary file corresponds to a security flaw. The identification may be based on, at least in part, the received report. The method also includes determining if a binary patch matching with the identified section exists in a library of patches. The matching binary patch can avoid or at least mitigate the security vulnerability, but the replacement desirably should not cause the behavior of the program to change significantly. As such, the method includes, if the matching patch is determined to exist, determining if replacing the identified section with the matching binary patch would result in a change in a function of the binary file. The method also includes, if no change in the function is determined to occur, replacing the identified section with the matching patch. In some embodiments, the method optionally includes generating a notification, e.g., to alert a user, if the library lacks the matching binary patch or if the replacement would change the function.

The identification of the section corresponding to the security flaw may be further based on, at least in part, a specified parameter, and the specified parameter may include one or more of a function name, a function type, a function parameter, and a language type. The function parameter may include a number of function arguments and/or a type of at least one function argument. In some embodiments, the identification of the section corresponding to the security flaw includes comparing a portion of the binary file with a reference. For example, a name of a class, function, or method invoked may be compared with a different, secure class, function, or method. The comparison may be an exact comparison or a fuzzy comparison, or a combination thereof.

In some embodiments, the method includes modifying, by the processor, the matching binary patch according to a context of the binary file, prior to replacing the identified section with the matching binary patch. Thus, the identified section may be replaced with a modified matching binary patch. The identified section may include an invocation of a function or method or declaration or instantiation of a class, data structure, or object. The matching patch may include an invocation of another different function or method, or declaration or instantiation of another different class, data structure, or object where the other function/method or class/data structure/object provides a functionality related to a functionality provided by the function/method or class/data structure/object to be replaced. In some embodiments, the two functionalities are identical or are at least significantly (e.g., at least 99%, at least 95%, at least 90%, at least 60%) similar. In some embodiments, a number of arguments of the other function/method is different than a number of arguments of the function/method to be replaced with the other function.

In some embodiments, the identified section includes a binary code segment providing a functionality in an unsecure manner, and the matching patch includes another binary code segment providing that or at least substantially (e.g., at least 99%, at least 95%, at least 90%, at least 60%) similar functionality in a secure manner. In some embodiments, to address the security vulnerability, a data associated with the portion of the code identified as unsecure may need to be sanitized, i.e., checked for any components therein that can expose/exploit a security vulnerability. Therefore, in some embodiments, the method includes determining a runtime context of the identified section and a data object. The method also includes selecting a filter based on, at least in part, the determined runtime context. The matching patch may include a binary code segment: (i) to invoke the selected filter with the data object to obtain a filtered data object, and (ii) to provide the filtered data object to the context.

The method may include adding another binary code segment providing functionality of the selected filter to the binary file corresponding to the application, e.g., if the one or more binary files corresponding to the application did not provide the functionality of the selected filter. In some embodiments, the binary file is associated with Java runtime or with .NET framework, and the context includes one or more of HTML context, HTML attribute context, and JavaScript context.

In another aspect, a computer system includes a first processor and a first memory coupled to the first processor. The first memory includes instructions which, when executed by a processing unit that includes the first processor and/or a second processor, program the processing unit to receive in a memory module that includes the first memory and/or a second memory coupled to the second processor, a static binary analysis report for a binary file corresponding to an application. The instructions also program the processing unit to identify a section of the binary file, based on, at least in part, the received report. The identified section may correspond to a security flaw. In addition, the instructions program the processing unit to determine if a binary patch matching with the identified section exists in a library of patches and, if the matching patch is determined to exist, determine if replacing the identified section with the matching binary patch would result in a change in a function of the binary file. Finally, the instructions program the processing unit to replace the identified section with the matching patch, if no change in the function was determined to occur. Optionally, in some embodiments, the instructions program the processing unit to generate a notification if the library lacks the matching binary patch or if the replacement would change the function. In some embodiments, the second memory coupled to the second processor can receive through a network the instruction stored in the first memory. In various embodiments, the instructions can program the processing unit to perform one or more of the method steps described above.

In another aspect, an article of manufacture that includes a non-transitory storage medium has stored therein instructions which, when executed by a processor program the processor to receive in memory coupled to the processor, a static binary analysis report for a binary file corresponding to an application. The instructions also program the processor to identify a section of the binary file, based on, at least in part, the received report. The identified section may correspond to a security flaw. In addition, the instructions program the processor to determine if a binary patch matching with the identified section exists in a library of patches and, if the matching patch is determined to exist, determine if replacing the identified section with the matching binary patch would result in a change in a function of the binary file. Finally, the instructions program the processor to replace the identified section with the matching patch, if no change in the function was determined to occur. Optionally, in some embodiments, the instructions program the processor to generate a notification if the library lacks the matching binary patch or if the replacement would change the function. In various embodiments, the stored instructions can program the processor to perform one or more of the method steps described above.

BRIEF DESCRIPTION OF THE DRAWINGS

Various embodiments of the present invention taught herein are illustrated by way of example, and not by way of limitation, in the figures of the accompanying drawings, in which:

FIG. 2B illustrates selection of a filter, according to one embodiment.

DETAILED DESCRIPTION OF THE INVENTION

Figure 1:
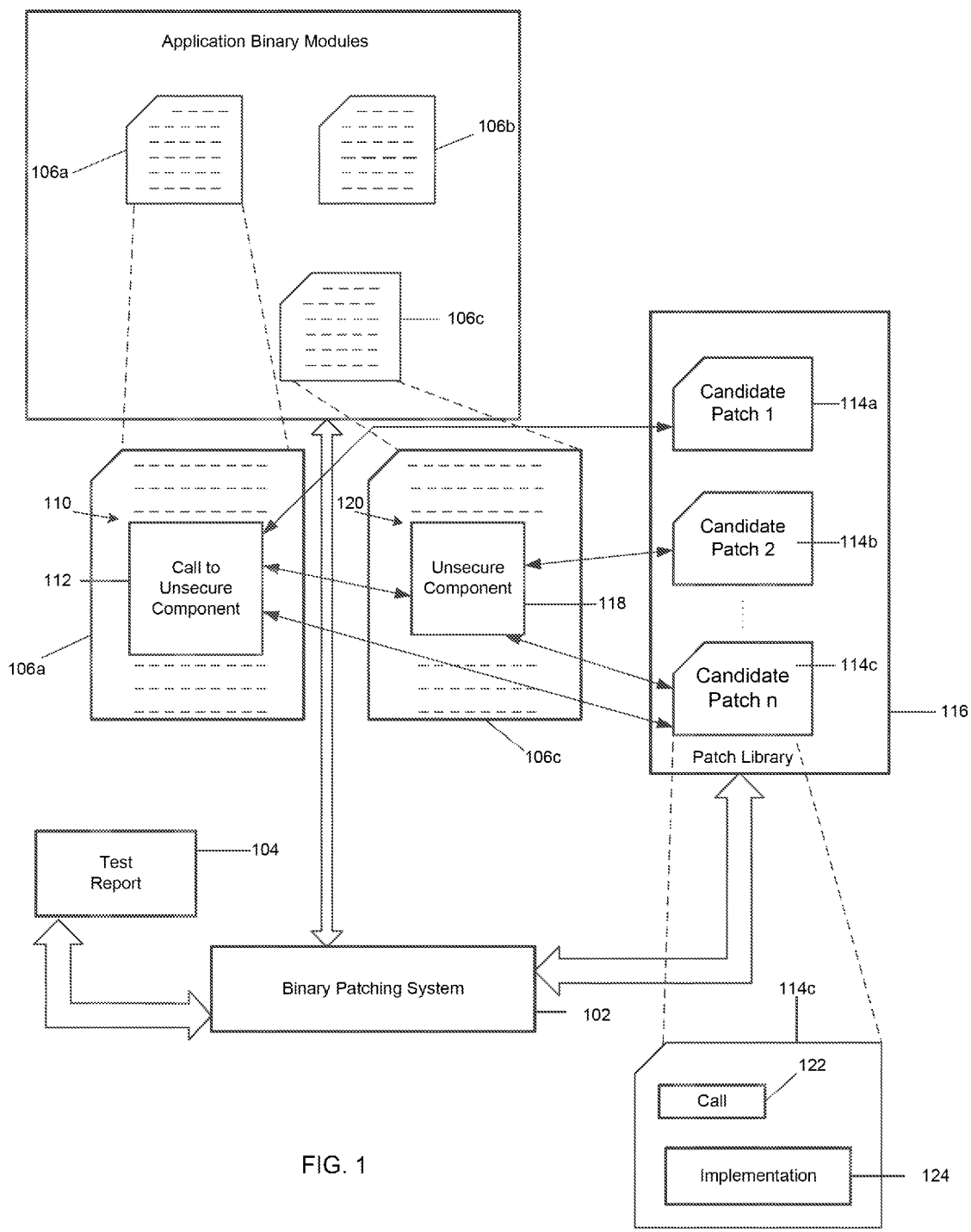
FIG. 1 schematically depicts a binary patching system and the operating environment thereof, according to one embodiment.

With reference to FIG. 1, the binary patching system 102 reads in the detailed test results/report 104 of a static binary analysis of one or more binary files 106a-c obtained by compiling a software application. In some embodiments, the binary files 106a-c correspond only to one or more modules of the software application and not to the entire application. It should be understood that three files are illustrative only, and that as few as a single file and more than three files (e.g., 5, 10, 40, 100) binary files that may collectively represent the software application are within the scope of various embodiments. The binary patching system 102 can determine the location of software security defects within the compiled binaries by analyzing the reports, i.e., test results 104. For example, the names of functions/methods invoked by the software application or a module thereof may be compared to the names in a specified list of functions/methods known to be vulnerable to intentional or accidental attacks.

One or more locations (e.g., a location 110) in the binary where one or more of the functions/methods that are known or determined to be vulnerable are invoked may then be determined. Often, a function determined to be vulnerable may be invoked several times at several different locations. In some embodiments, only one, a few, or all of these locations are identified as locations of security defects. Once a location of a defect (e.g., the location 110) is determined, a portion (e.g., a portion 112) of the binary determined to be associated with the located defect is identified. One or more replacements (also called patches) 114a-c for that portion are identified as well. It should be understood that three patches are illustrative only, and that as few as a one and more than three binary patches (e.g., 5, 8, 40, 100) candidate and/or suitable replacement patches are within the scope of various embodiments.

To identify suitable patches, the functionality associated with the identified portion may be compared with alternatives that provide the same or similar functionality, but in a more secure manner. These alternatives may be accessed from a library and/or a database of patches 116. The identification of the defects, their locations, and/or the selection of replacement patches can be based on one or more parameters such as the source-code language, a name/type of function/method invoked, a number of parameters/arguments of the function/method invoked, type or types of one or more function parameters/arguments, etc. A choice of a suitable alternative can be based on an exact comparison (e.g., replacing in-secured random number generation with secured random number generation, replacing "strcpy" with "strncpy," etc.).

In some embodiments, once a suitable patch (e.g., the patch 114a) is selected, the portion identified as associated with the defect (e.g., the portion 112) is replaced with the selected patch. Thus, instead of invoking a function/method that may provide the required functionality in an unsecure manner, a different function/method may be invoked that can provide substantially the same functionality, but in a secure manner. In some situations, the replacement invocation requires additional data. For example, if "strcpy" is replaced with "strncpy," a size of memory must be supplied to the new function call. The additional data can be obtained from the test results, for example by analyzing the context of the location of the defect.

In some situations, the binary code providing the replacement functionality may be included already in the one or more binary files 106a-106c of the software application. Such code may be included, for example, in a library 106b linked to one or more binaries corresponding to the software application. As such, in these situations, simply invoking a secure function/method with any additional or different parameters as necessary, instead of invoking the unsecure function/method, can adequately address the vulnerability. Therefore, in some embodiments, the replacement binary patch modifies only the invocation of a function/method identified as vulnerable.

In other cases, however, the binary code providing the replacement functionality is not a part of the one or more binary files corresponding to the program. Therefore, in some embodiments, the locations where binary code implementing the functionality of the functions/method identified to be vulnerable are also determined, and these locations are also designated as the locations of security defects. For example, the binary code 118 providing the functionality associated with an unsecure function/method call at the location 110 may be included in the binary file 106c, at a location 120. Therefore, the location 120 may be designated as the location of a security defect in addition to or instead of the location 110.

In some embodiments, a selected replacement patch 114c includes not only a binary code segment 122 to modify the unsecure function/method invocation at the location 110, but also another binary code segment 124 that implements the functionality of the replacement secure function/method. The invocation 112 at the location 110 of the defective code may be replaced, as described above, with the binary code segment 122. Additionally or in the alternative, the defective code 118 itself at the location 120 may be replaced with the secure implementation 124. In some embodiments, the secure implementation is added to the one or more binary files 106a-c that are associated with the software program. In some embodiments, a replacement binary patch may include only a secure implementation of a function/method invoked in a binary file.

By applying a selected binary patch, i.e., by replacing in the binary files the portion identified to be defective with a patch, the system can modify insecure instruction patterns to transform them into more secure ones. For example, the patching system may modify the compiled class files in a Java module that calls java/lang/math/Random, which is determined not to be a highly secure component. The calls to java/lang/math/Random are replaced with calls to the more secure java/security/SecureRandom module. Similarly, a C/C++ executable which calls "strcpy" of an arbitrary (e.g., variable length) input into a fixed sized buffer, thereby introducing a vulnerability, may be modified to call "strncpy" instead, so as to limit the length of data copied into the destination buffer, preventing buffer overflows.

In some embodiments, the patches are modified before they are applied to the binary files. For instance, in the above mentioned strcpy example, applying the strncpy fix requires knowledge of the length of the destination buffer, and setting that length as the maximum length to copy. Part of the output of the binary analysis includes some context about the flaws, which in the case of buffer overflows includes the length detected for the destination buffer. By using that value with the strncpy modification, it can be ensured the data copied always fits in the destination buffer. Thus, the fix is like a template to which data pulled from the analysis (e.g., the buffer length) can be applied.

A selection of a suitable alternative can also be based on a fuzzy comparison. An exemplary fuzzy match can be a context-sensitive cross site scripting (XSS) patch that is based on matching against the context of the flaw location. To illustrate, if the flaw location matches against a pattern testing for a basic HTML context, the data being output might only need to be HTML encoded to fix the flaw. If the patcher fails to match the location to any particular pattern, the patcher may default to using a stricter filter, such as URL encoding (which may affect program execution/usability).

Figure 2A:
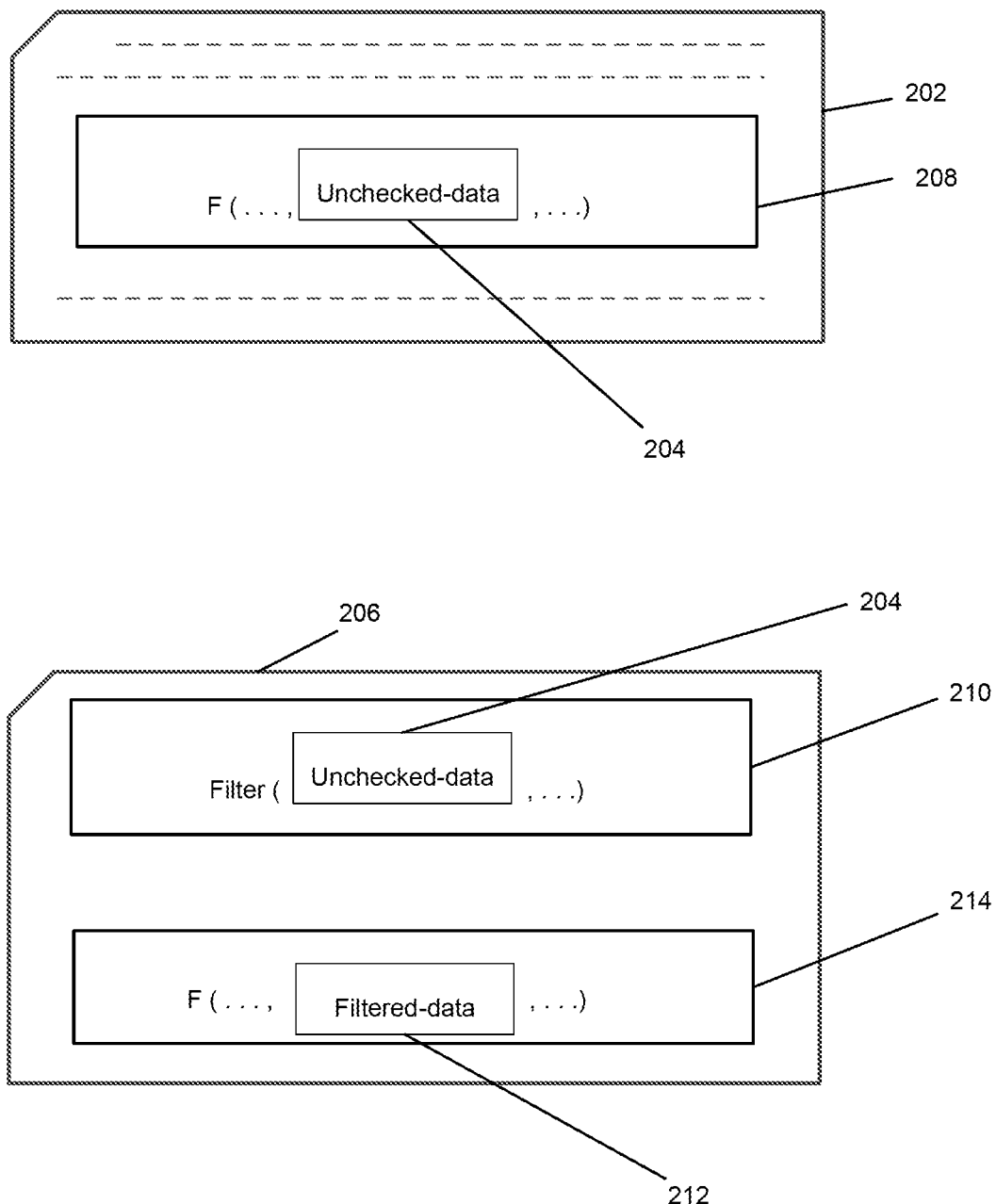
FIG. 2A schematically depicts a patch using a filter to filter unchecked data, according to one embodiment.

With reference to FIG. 2A, in some embodiments, it is determined that in a binary file 202, a vulnerability is associated with the use of unchecked data 204, such as user-supplied data received in an input field of a webpage. Therefore, in these embodiments, the replacement patch 206 does not necessarily replace a call 208 to a function/method with a call to or invocation of a replacement function/method. Instead, the replacement patch 206 invokes a filter 210 to check and/or sanitize data that is to be subsequently passed to another function/method (e.g., the function/method corresponding to the call/invocation 208). The replacement patch 206 may obtain filtered data 212 and may invoke the function/method via a modified call/invocation 214 that uses the filtered data 212 (e.g., data determined not to expose or exploit a vulnerability in the software application), instead of the unchecked data 204. In various embodiments, the suitable patch 206 is selected based on, at least in part, a runtime environment and/or context of the software application.

For example, with reference to FIG. 2B, a binary patching system 252 determines that the software application includes an XSS vulnerability 254. The system 252 also determines whether the runtime of the software application is based on Java 256 or includes the .NET framework 258. It should be understood that Java runtime and .NET framework are illustrative only and that other runtimes such as C/C++ execution environment, Ruby, etc., are also within the scope of various embodiments. A context of the location where the vulnerability 254 was detected is also determined by the binary patching system 252. Examples of contexts include, but are not limited to, HTML contexts 260a-b, HTML Attribute contexts 262a-b, and JavaScript contexts 264a-b. The nature of the vulnerability that any unchecked data can expose or exploit generally though not necessarily depends on the runtime environment and/or the context. As such, in some embodiments, the system 252 selects a suitable filter to sanitize the unchecked data. Examples of filters include, but are not limited to, runtime-environment specific encoders such as encodes for HTML 266a-b, encoders for HTML attributes 268a-b, and JavaScript encoders 270a-b. As described with reference to FIG. 2A, the replacement patch can invoke the functions/methods that may be vulnerable to unchecked data using the filtered, e.g., sanitized data, thereby mitigating or avoiding such security vulnerabilities.

In some situations, it is not be possible to replace all portions determined to be associated with defects with patches, e.g., because a suitable patch is not found in the library. Also, replacement with some selected patches may modify the ultimate application behavior. For example, some classes of fixes are expected to have an impact on usability/behavior. In the example of fixing cross-site scripting with a URL encoding, a page that outputs "Hello, [name]" may be modified by applying two different XSS fixes. HTML encoding for the name "ABC XYZ" would output "Hello, ABC XYX," while using URL Encoding would instead output "Hello, ABC%20XYZ." In these situations, the security defects and the associated portions in the binary files and/or the corresponding source file locations may be notified to the user. In some embodiments, the user notification is provided in all instances, even when a suitable patch that is not expected to modify the ultimate software behavior is identified, allowing the user to select which portions determined to be defective may be replaced with the identified patches.

In general, replacement of the identified portion with a matching patch can cure or at least mitigating the defect, without requiring intervention by skilled personnel, thereby decreasing the time-to-deliver in the SDLC and/or cost of software development. An analysis of the expected behavior of the software application after the replacement can ensure or at least minimize the risk that the replacement is not inconsistent with the remainder of the application, and that it did not introduce additional flaws. The remediation of flaws without any or minimal development effort can be a significant value-add for a security as a service system. These systems can also be incorporated with static, dynamic, and/or manual assessment systems, which can be used for testing the patched binary to verify that the automated remediation did not substantially modify the originally specified behavior of the software system. This can save both development and QA efforts. Advantageously, as software execution is not essential in static systems, the detection and mitigation of vulnerabilities can be performed as some components of a large software system are developed and compiled, before all components are developed and the entire software is assembled.

It is clear that there are many ways to configure the device and/or system components, interfaces, communication links, and methods described herein. The disclosed methods, devices, and systems can be deployed on convenient processor platforms, including network servers, personal and portable computers, and/or other processing platforms. Other platforms can be contemplated as processing capabilities improve, including personal digital assistants, computerized watches, cellular phones and/or other portable devices. The disclosed methods and systems can be integrated with known network management systems and methods. The disclosed methods and systems can operate as an SNMP agent, and can be configured with the IP address of a remote machine running a conformant management platform. Therefore, the scope of the disclosed methods and systems are not limited by the examples given herein, but can include the full scope of the claims and their legal equivalents.

The methods, devices, and systems described herein are not limited to a particular hardware or software configuration, and may find applicability in many computing or processing environments. The methods, devices, and systems can be implemented in hardware or software, or a combination of hardware and software. The methods, devices, and systems can be implemented in one or more computer programs, where a computer program can be understood to include one or more processor executable instructions. The computer program(s) can execute on one or more programmable processing elements or machines, and can be stored on one or more storage medium readable by the processor (including volatile and non-volatile memory and/or storage elements), one or more input devices, and/or one or more output devices. The processing elements/machines thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processing element as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) and/or processing elements can thus be embedded in one or more devices that can be operated independently or together in a networked environment, where the network can include, for example, a Local Area Network (LAN), wide area network (WAN), and/or can include an intranet and/or the Internet and/or another network. The network(s) can be wired or wireless or a combination thereof and can use one or more communications protocols to facilitate communications between the different processors/processing elements. The processors can be configured for distributed processing and can utilize, in some embodiments, a client-server model as needed. Accordingly, the methods, devices, and systems can utilize multiple processors and/or processor devices, and the processor/processing element instructions can be divided amongst such single or multiple processor/devices/processing elements.

The device(s) or computer systems that integrate with the processor(s)/processing element(s) can include, for example, a personal computer(s), workstation (e.g., Dell, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a processor", or "a processing element," "the processor," and "the processing element" can be understood to include one or more microprocessors that can communicate in a stand-alone and/or a distributed environment(s), and can thus can be configured to communicate via wired or wireless communications with other processors, where such one or more processor can be configured to operate on one or more processor/processing elements-controlled devices that can be similar or different devices. Use of such "microprocessor," "processor," or "processing element" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. For example, the memory can be a flash drive, a computer disc, CD/DVD, distributed memory, etc. References to structures include links, queues, graphs, trees, and such structures are provided for illustration and not limitation. References herein to instructions or executable instructions, in accordance with the above, can be understood to include programmable hardware.

Although the methods and systems have been described relative to specific embodiments thereof, they are not so limited. As such, many modifications and variations may become apparent in light of the above teachings. Many additional changes in the details, materials, and arrangement of parts, herein described and illustrated, can be made by those skilled in the art. Accordingly, it will be understood that the methods, devices, and systems provided herein are not to be limited to the embodiments disclosed herein, can include practices otherwise than specifically described, and are to be interpreted as broadly as allowed under the law.

Accordingly, I claim:

1. A method for automatically remedying security flaws, the method comprising the steps of:
   receiving in memory a static binary analysis report for a binary file corresponding to an application;
   identifying a section of the binary file, by a processor, based on, at least in part, the received report, the identified section having a security flaw associated with a data object processed by the identified section;
   determining if a binary patch matching with the identified section exists in a library of patches;
   if the matching patch is determined to exist, determining if replacing the identified section with the matching binary patch would result in a change in a function of the binary file;
   if no change in the function is determined to occur, replacing the identified section with the matching patch; and
   if no matching binary patch is determined to exist or if a change in the function due to the matching binary patch is determined to occur, modifying the identified section to: (i) invoke a data filter to filter the data object and to obtain a filtered data object, and (ii) use the filtered data object.

2. The method of claim 1, further comprising:
   generating a notification that a matching binary patch or a data filter was applied.

3. The method of claim 1, wherein the identification of the section corresponding to the security flaw is further based on, at least in part, at least one of a function name, a function type, a function parameter, and a language type.

4. The method of claim 3, wherein the function parameter comprises at least one of a number of function arguments and a type of at least one function argument.

5. The method of claim 1, wherein the identification of the section corresponding to the security flaw comprises comparing a portion of the binary file with a reference segment indicative of a known vulnerability.

6. The method of claim 5, wherein the comparison is one of an exact comparison and a fuzzy comparison.

7. The method of claim 1, further comprising modifying, by the processor, the matching binary patch according to a context of the binary file, prior to replacing the identified section.

8. The method of claim 1, wherein:
   the identified section comprises an invocation of a function; and
   the matching patch comprises an invocation of another different function, providing functionality comprising functionality provided by the function.

9. The method of claim 8, wherein a number of arguments of the other function is different than a number of arguments of the function.

10. The method of claim 1, wherein:
    the identified section comprises a binary code segment providing a functionality in an unsecure manner; and
    the matching patch comprises another binary code segment providing the functionality in a secure manner.

11. The method of claim 1, further comprising:
    analyzing context of the identified section;
    if the context is determined, selecting a context-based data filter as the data filter; and
    otherwise, selecting a default data filter as the data filter.

12. The method of claim 11, wherein the binary file is associated with Java runtime or .NET framework, and the context comprises at least one of HyperText Markup Language (HTML) context, HTML attribute context, and JavaScript context.

13. The method of claim 1, further comprising adding another binary code segment providing functionality of the data filter to the binary file corresponding to the application.

14. A system comprising:
    a first processor; and
    a first memory coupled to the first processor, the first memory comprising instructions which, when executed by a processing unit comprising at least one of the first processor and a second processor, program the processing unit, for automatically remedying security flaws, to:
    receive in a memory module comprising at least one of the first memory and a second memory coupled to the second processor, a static binary analysis report for a binary file corresponding to an application;
    identify a section of the binary file based on, at least in part, the received report, the identified section having a security flaw associated with a data object processed by the identified section;
    determine if a binary patch matching with the identified section exists in a library of patches;
    if the matching patch is determined to exist, determine if replacing the identified section with the matching binary patch would result in a change in a function of the binary file;
    if no change in the function is determined to occur, replace the identified section with the matching patch; and
    if no matching binary patch is determined to exist or if a change in the function due to the matching binary patch is determined to occur, modify the identified section to: (i) invoke a data filter to filter the data object and to obtain a filtered data object, and (ii) use the filtered data object.

15. The system of claim 14, wherein the instructions further program the processing unit to:

generate a notification that a matching binary patch or a data filter was applied.

16. The system of claim 15, wherein:
the identification of the section corresponding to the security flaw is further based on, at least in part, at least one of a function name, a function type, a function parameter, and a language type.

17. The system of claim 16, wherein the function parameter comprises at least one of a number of function arguments and a type of at least one function argument.

18. The system of claim 14, wherein to identify the section corresponding to the security flaw, the instructions program the processing unit to compare a portion of the binary file with a reference segment indicative of a known vulnerability.

19. The system of claim 18, wherein the comparison is one of an exact comparison and a fuzzy comparison.

20. The system of claim 14, wherein the instructions further program the processing unit to modify the matching binary patch according to a context of the binary file, prior to replacing the identified section.

21. The system of claim 14, wherein:
the identified section comprises an invocation of a function; and
the matching patch comprises an invocation of another different function, providing a functionality comprising functionality provided by the function.

22. The system of claim 21, wherein a number of arguments of the other function is different than a number of arguments of the function.

23. The system of claim 14, wherein:
the identified section comprises a binary code segment providing a functionality in an unsecure manner; and
the matching patch comprises another binary code segment providing the functionality in a secure manner.

24. The system of claim 14, wherein the instructions further program the processing unit to:
analyze context of the identified section;
if the context is determined, select a context-based data filter as the data filter; and
otherwise, select a default data filter as the data filter.

25. The system of claim 24, wherein the binary file is associated with Java runtime or .NET framework, and the context comprises at least one of HTML context, HyperText Markup Language (HTML) attribute context, and JavaScript context.

26. The system of claim 14, wherein the instructions further program the processing unit to add another binary code segment providing functionality of the data filter to the binary file corresponding to the application.

27. An article of manufacture comprising a non-transitory storage medium having stored therein instructions which, when executed by a processor, program the processor, for automatically remedying security flaws, to:
receive in memory coupled to the processor a static binary analysis report for a binary file corresponding to an application;
identify a section of the binary file based on, at least in part, the received report, the identified section having a security flaw associated with a data object processed by the identified section;
determine if a binary patch matching with the identified section exists in a library of patches;
if the matching patch is determined to exist, determine if replacing the identified section with the matching binary patch would result in a change in a function of the binary file;
if no change in the function is determined to occur, replace the identified section with the matching patch; and
if no matching binary patch is determined to exist or if a change in the function due to the matching binary patch is determined to occur, modify the identified section to: (i) invoke a data filter to filter the data object and to obtain a filtered data object, and (ii) use the filtered data object.

* * * * *